(12) United States Patent
Yamabayashi

(10) Patent No.: US 12,523,476 B2
(45) Date of Patent: Jan. 13, 2026

(54) ROUTE PLANNING DEVICE, ROUTE PLANNING METHOD, AND PROGRAM

(71) Applicant: Furuno Electric Co., Ltd., Nishinomiya (JP)

(72) Inventor: Jun Yamabayashi, Sayama (JP)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 286 days.

(21) Appl. No.: 17/842,789

(22) Filed: Jun. 17, 2022

(65) Prior Publication Data

US 2022/0316886 A1    Oct. 6, 2022

Related U.S. Application Data

(63) Continuation of application No. PCT/JP2021/000480, filed on Jan. 8, 2021.

(30) Foreign Application Priority Data

Feb. 12, 2020 (JP) .................... 2020-021624

(51) Int. Cl.
*G01C 21/20* (2006.01)
*B63B 49/00* (2006.01)
*G01C 21/00* (2006.01)

(52) U.S. Cl.
CPC .............. *G01C 21/20* (2013.01); *B63B 49/00* (2013.01); *G01C 21/005* (2013.01)

(58) Field of Classification Search
CPC ........ G01C 21/20; G01C 21/005; B63B 49/00
See application file for complete search history.

(56) References Cited

U.S. PATENT DOCUMENTS

| 9,214,132 B2 | 12/2015 | Shimizutani et al. |
| 9,612,120 B2 | 4/2017 | Shimizutani et al. |
| 9,842,567 B2 | 12/2017 | Shimizutani et al. |

(Continued)

FOREIGN PATENT DOCUMENTS

| CN | 101319903 A | 12/2008 |
| CN | 103376109 A | 10/2013 |

(Continued)

OTHER PUBLICATIONS

Extended European search report issued on Feb. 22, 2024, in corresponding European patent Application No. 21753068.2, 14 pages.

(Continued)

*Primary Examiner* — Andrea C Leggett
(74) *Attorney, Agent, or Firm* — XSENSUS LLP

(57) ABSTRACT

A route planning device is provided with a display configured to display a chart on a screen, an operation interface configured to specify a position on the screen, a storage configured to store navigation publication related to a book referred to during past route planning in association with the position, a waypoint setting module configured to set a waypoint on the chart in response to a user's operation received by the operation interface, a navigation publication acquisition module configured to acquire navigation publication within a range of the set waypoint as a reference from the storage, and a display control module configured to display the acquired navigation publication on the screen of the display.

20 Claims, 6 Drawing Sheets

(56) References Cited

U.S. PATENT DOCUMENTS

| | | | | |
|---|---|---|---|---|
| 2011/0035087 | A1* | 2/2011 | Kim | G05D 1/0274 |
| | | | | 701/25 |
| 2013/0275046 | A1* | 10/2013 | Shimizutani | G01C 21/203 |
| | | | | 701/538 |
| 2014/0309931 | A1* | 10/2014 | Ohmori | G01C 21/203 |
| | | | | 701/466 |
| 2017/0041741 | A1* | 2/2017 | Stevens | H04L 67/306 |
| 2022/0357160 | A1* | 11/2022 | Okuda | G01C 21/005 |
| 2024/0151538 | A1* | 5/2024 | Scott | B64D 45/00 |
| 2025/0004474 | A1* | 1/2025 | Ji | G05D 1/229 |

FOREIGN PATENT DOCUMENTS

| | | |
|---|---|---|
| CN | 106871897 A | 6/2017 |
| CN | 109470247 A | 3/2019 |
| CN | 110364027 A | 10/2019 |
| JP | 2013-217860 A | 10/2013 |
| JP | 2013-218210 A | 10/2013 |
| KR | 2015-0072808 A | 6/2015 |
| WO | 2011/027032 A1 | 3/2011 |

OTHER PUBLICATIONS

"SkyDemon Flight Planning Features", total 6 pages, Jan. 29, 2020, Retrieved from the Internet: https://web.archive.org/web/20200129164845/https://www.skydemon.aero/plan/.

International Search Report and Written Opinion mailed on Mar. 16, 2021, received for PCT Application PCT/JP2021/000480, filed on Jan. 8, 2021, 8 pages including English Translation.

Cao Yu-chi et al., "World Shipping", Special Topic Lecture, Operation of Admiralty Digital Catalogue, vol. 31, No. 2, Apr. 2008, pp. 53-54, total 4 pages.

* cited by examiner

Navigation Publication DB 22

| ID 31 | Book Title 32 | Book Number 33 | Page 34 | Comment 35 | Position 36 | Registration Date & Time 37 | Vessel Information 38 | ... |
|---|---|---|---|---|---|---|---|---|
| 01 | zzzzz | nnn | ppp | mmmm | xxx, yyy | yymmdd | ssss | ... |
| 02 | zzzzz | nnn | ppp | mmmm | xxx, yyy | yymmdd | ssss | ... |
| 03 | zzzzz | nnn | ppp | mmmm | xxx, yyy | yymmdd | ssss | ... |
| 04 | zzzzz | nnn | ppp | - | xxx, yyy | yymmdd | ssss | ... |
| 05 | zzzzz | nnn | ppp | - | xxx, yyy | yymmdd | ssss | ... |

FIG.3

ROUTE PLANNING DEVICE, ROUTE PLANNING METHOD, AND PROGRAM

CROSS-REFERENCE TO RELATED APPLICATION(S)

This application is a continuation of PCT International Application No. PCT/JP2021/000480, which was filed on Jan. 8, 2021, and which claims priority to Japanese patent Application No. 2020-021624 filed on Feb. 12, 2020, the entire disclosures of each of which are herein incorporated by reference for all purposes.

TECHNICAL FIELD

The present invention relates to a route planning device, a route planning method, and a program.

BACKGROUND

Conventionally, route planning devices are equipped in movable bodies (such as, automobiles, ships, airplanes) to display a route to be navigated by a user. The user inputs a departure location and a destination location to get the desired route from the route planning device. For example, the route planning devices equipped in automobiles are stored with maps. Based on the maps, these devices display various kinds of routes according to the user requirement. Patent Document 1 discloses such a route planning device.

As used herein, the patent document 1 is JP6076611. The route planning device of patent document 1 comprising: a display for displaying a route to be navigated prepared by a user on a map; a date/time input module for receiving input of a navigation date/time of the route; a caution information reading module for reading caution information that corresponds to information affecting navigation and information associated with a position and a date/time based on the navigation date/time input to the date/time input module; and a route verification module for extracting the caution information located at least on the route or in the vicinity of the route based on the position indicated by the caution information read by the caution information reading module and the position of the route and verifying the route based on the extracted caution information.

However, the route planning device disclosed in patent document 1 is not immensely helpful. During the route planning, an officer needs to set waypoints by not only obtaining information from the nautical chart but also by checking paper books such as nautical publications in order to consider the laws and regulations of each region and the situation peculiar to the sea area. However, it takes a lot of time for searching the appropriate books and pages. In addition, it is not clear that on what grounds the routes and waypoints in past were set for a route, by only referring to them.

The present invention is made in view of the above-mentioned problems. The objective of the present invention is to provide a route planning device, a route planning method, and a program for easily confirming navigation publications referred to during the past route planning.

SUMMARY

To solve the problem mentioned above, a route planning device according to one aspect of the present invention comprises: a display configured to display a chart on a screen; an operation interface configured to specify a position on the screen; a storage configured to store navigation publication related to a book referred to during a route planning in the past in association with the position; a waypoint setting module configured to set a waypoint on the chart in response to a user's operation received by the operation interface; a navigation publication acquisition module configured to acquire from the storage, the navigation publication within a range with the set waypoint as a reference from the storage; and a display control module configured to display the acquired navigation publication on the screen of the display.

The route planning device according to another aspect of the present invention comprises: the display control module which may display the navigation publication at an associated position on the chart.

The route planning device according to another aspect of the present invention comprises: the display control module which may display a symbol for referring to the navigation publication, and to display the navigation publication associated with the symbol based on the symbol selected by the user's operation.

The route planning device according to another aspect of the present invention comprises: the display control module which may display a list associated with the navigation publication, the list being arranged according to an associated predetermined degree of similarity on a screen of the display.

In the route planning device according to another aspect of the present invention, the predetermined degree of similarity may be based on at least one of a distance from the waypoint, registration date and time of the navigation publication, and vessel information associated with a ship navigating the route.

The route planning device according to another aspect of the present invention further comprises: a storage processing module which may store a navigation publication database (navigation publication DB) in the storage in association with the position, and the navigation publication DB stores the navigation publication related to the book referred to during the route planning in the past in association with position.

In the route planning device according to another aspect of the present invention, the navigation publication DB may comprise one or more fields, comprising at least one of: a book title, a book number, a page, a comment, a position, registration date and time, and vessel information.

A route planning method according to another aspect of the present invention comprises: setting waypoints on the chart according to user's actions; acquiring the navigation publication within the range of the set waypoint as a reference from a storage that stores the navigation publication. The navigation publication being related to a book referred to during the past route planning in association with the position. The route planning method further comprising displaying the acquired navigation publication.

In yet another embodiment, a non-transitory computer-readable storage medium storing processor-executable instructions is disclosed. The processor-executable instructions cause one or more processors to: set waypoints on the chart according to user actions; acquire a navigation publication within the range of the set waypoint as a reference from a storage that stores the navigation publication, the navigation publication being related to a book referred to during the past route planning in association with the position; and to display the acquired navigation publication.

According to the present invention, it is easy to confirm the navigation publication referred to during the route planning in the past.

BRIEF DESCRIPTION OF THE DRAWINGS

The present invention is illustrated by way of example and not by way of limitation in the figures of the accompanying drawings, in which the like reference numerals indicate like elements and in which:

FIG. 3 is a diagram showing an example of the contents of a database, in accordance with an embodiment of the present invention;

DETAILED DESCRIPTION

Embodiments of the present invention will be described below with reference to the drawings.

Figure 1:
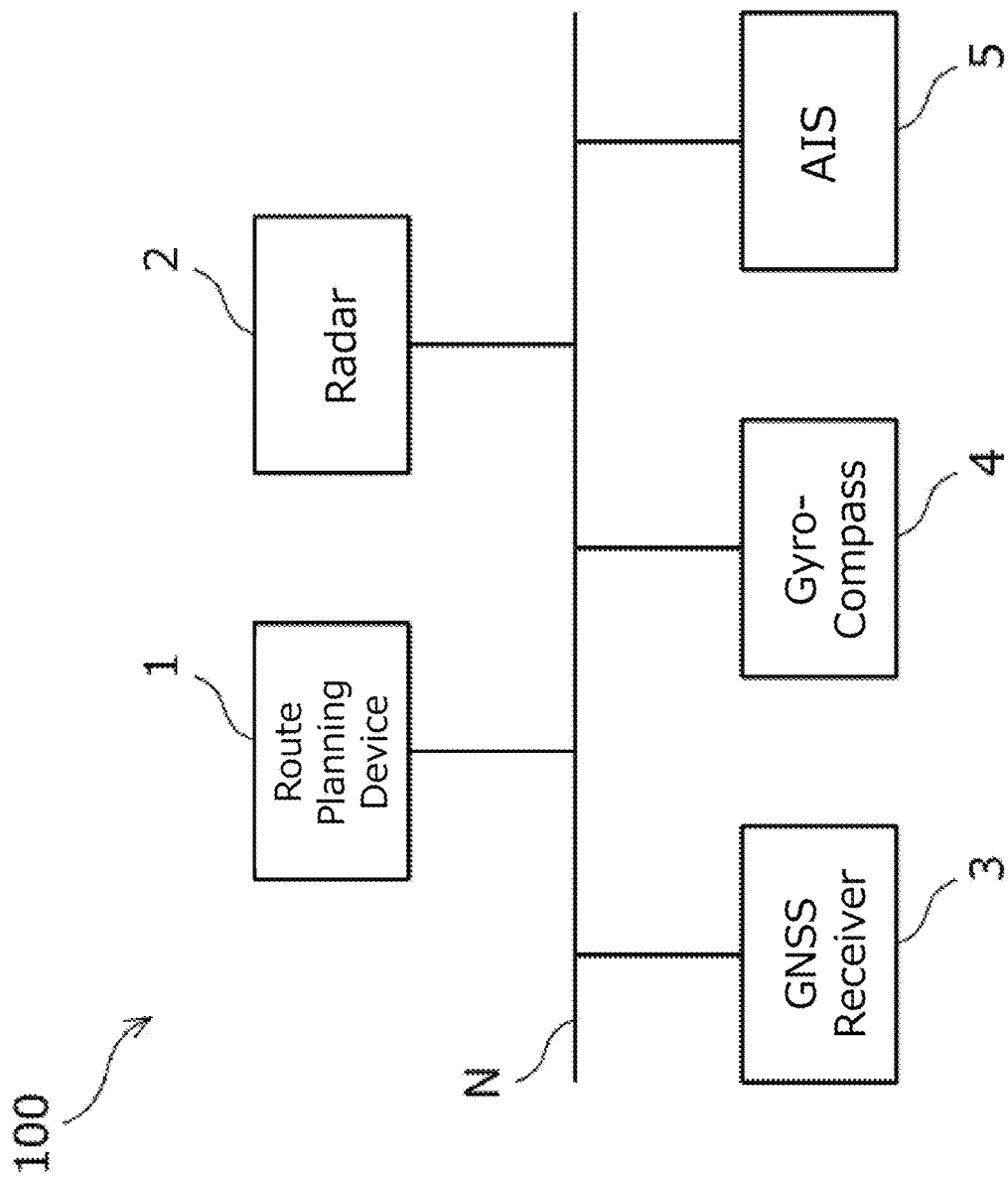
FIG. 1 is a diagram showing a configuration example of a ship ICT system, in accordance with an embodiment of the present invention.

FIG. 1 is a block diagram showing a configuration example of a ship ICT system 100, in accordance with an embodiment of the present invention.

The ship ICT system 100 includes a route planning device 1, a radar 2, a Global Navigation Satellite System (GNSS) receiver 3, a gyrocompass 4, and an Automatic Identification System (AIS) 5. The above-mentioned components of the ICT system 100 are connected to a network N for communicating with each other. The network N includes but may not be limited to a LAN (Local Area Network).

The route planning device 1 is an Electronic Chart Display and Information System (herein after ECDIS). The route planning device 1 may be a GNSS plotter. A specific configuration example of the route planning device 1 will be described later.

The radar 2 detects a target existing around a corresponding or own ship (herein after, the ship). In addition, the radar 2 generates target tracking data (TT data) representing the position and velocity vector of each target.

The GNSS receiver 3 detects the position of the ship based on radio waves received from the GNSS (Global Navigation Satellite System) and generates position data representing the position of the ship.

The gyrocompass 4 detects the heading of the ship and generates bearing data showing the heading. Alternatively, a GPS compass or a magnetic compass may be employed in the ship ICT system 100 to detect the heading of the ship.

The AIS 5 corresponds to Automatic Identification System that transmits AIS data to surrounding ships and land control centers and receives AIS data from surrounding ships and the land control centers. In addition, a VHF Data Exchange System (VDES) may be employed in the ship ICT system 100.

Figure 2:
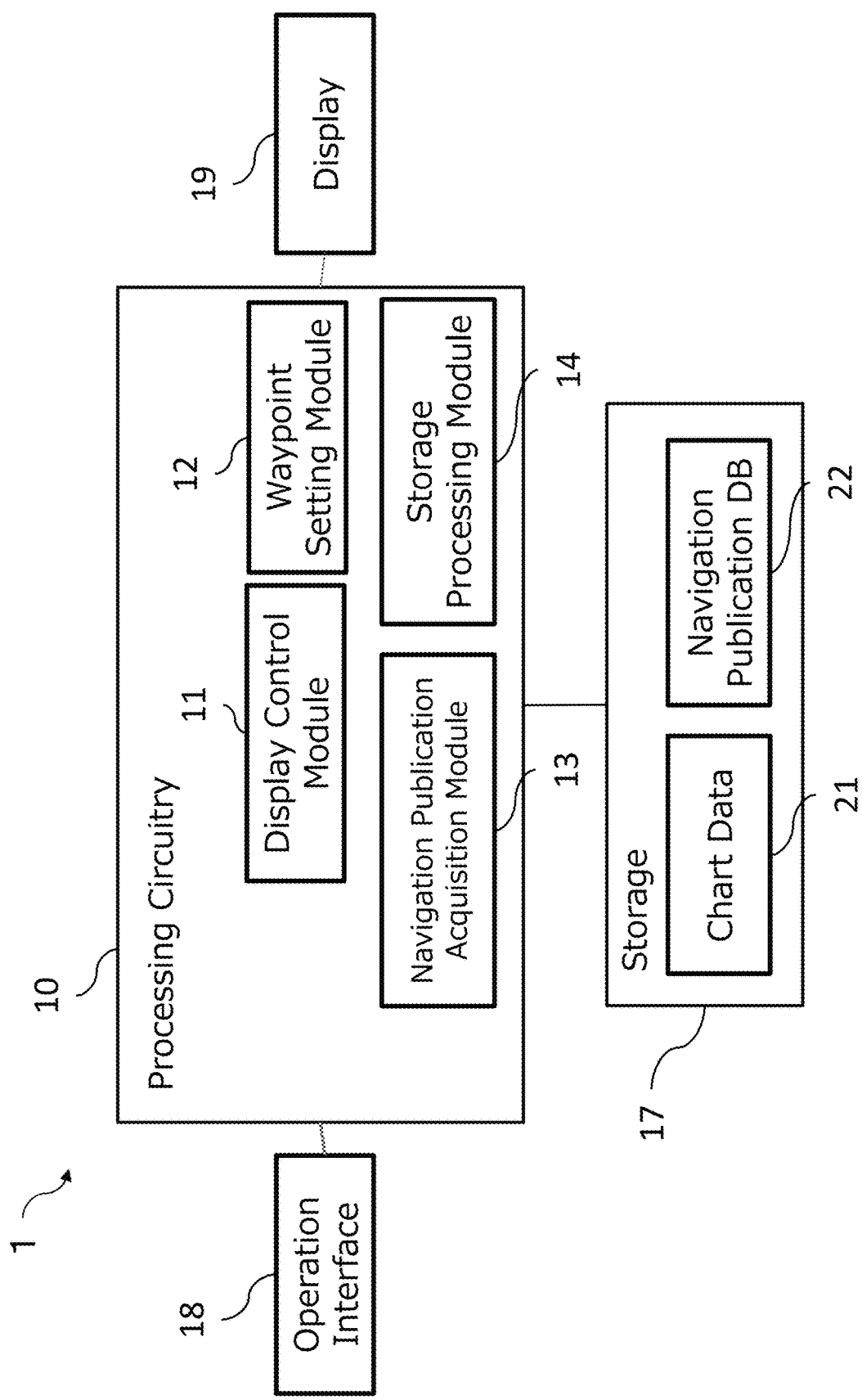
FIG. 2 is a diagram showing a configuration example of a route planning device, in accordance with an embodiment of the present invention.

FIG. 2 is a block diagram showing a configuration example of the route planning device 1, in accordance with an embodiment of the present invention. The route planning device 1 includes processing circuitry 10, a storage 17, an operation interface 18, and a display 19.

The processing circuitry 10 is a computer that includes a CPU, a RAM, a ROM, an input/output interface, and the like. In addition, the processing circuitry 10 may comprise processing circuitry. The processing circuitry 10 is associated with the storage 17. The storage 17 is an auxiliary storage device such as a nonvolatile memory. The CPU of the processing circuitry 10 executes information processing according to the program loaded from the storage 17 into the RAM.

In accordance with an embodiment, the program may be supplied via an information storage medium such as, for example, an optical disk or a memory card, or may be supplied via a communication network such as, the Internet or a LAN. In an embodiment, the storage 17 comprises a non-transitory computer-readable storage medium storing processor-executable instructions. The processor-executable instructions may be executed by the processing circuitry or by one or more processors associated with or comprised within the processing circuitry 10. The processor-executable instructions may be associated with of comprise the program loaded from the storage 17.

In addition to the program, the storage 17 may also store chart data 21, a navigation publication database (navigation publication DB) 22, and the like. The navigation publication DB 22 may be constructed externally and accessed via a communication network such as the Internet or the LAN.

The processing circuitry 10 is associated with the operation interface 18. The operation interface 18 is a pointing device configured to specify a position on the screen of the display 19, such as a trackball or a touch sensor. The processing circuitry 10 is further associated with the display 19. The display 19 may be a display device such as a liquid crystal display (LED) or an organic electro-luminescence display (OELD).

The processing circuitry 10 includes a display control module 11, a waypoint setting module 12, a navigation publication acquisition module 13, and a storage processing module 14. The CPU of the processing circuitry 10 is configured to execute control processing of each module of the processing circuitry 10, in accordance with a program. The operation of each module of the processing circuitry 10 is described in detail later.

FIG. 3 is a diagram showing an example of the contents of the navigation publication DB 22. The navigation publication DB 22 stores navigation publication related to the book referred to during the route planning in the past in association with position specified for the waypoint setting.

In an embodiment, the navigation publication corresponds to a waypoint set in the past. In addition, the navigation publication is the navigation publication referred to at the time of setting the way point in the past.

The navigation publication DB 22 includes but may not be limited to one or more fields such as "ID" 31, "Book Title" 32, "Book Number" 33, "Page" 34, "Comment" 35, "Position" 36, "Registration Date and Time" 37, and "Vessel Information" 38.

"ID" 31 is an identifier for identifying the navigation publication. In addition, "ID" 31 may be an identifier of a waypoint set in the past.

"Book Title" 32, "Book Number" 33, and "Page" 34 refer to a book title, a book number, and a page (respectively) of the book referenced during the past route planning. "Comment" 35 represents a character string entered by a user who referred to the book.

"Position" 36 represents the position of the navigation publication, that is, the position of the waypoint set in the past. In an example, the position of the navigation publication is expressed by position coordinates of latitude and longitude.

"Registration Date and Time" 37 indicates the registration date and time of the navigation publication DB 22. "Vessel information" 38 refers to information on vessels which traveled the route. "Vessel information" 38 includes but may not be limited to information such as a classification indicating size of vessels, or a draught when traveling the route.

In the present embodiment, the navigation publication DB 22 includes, but is not limited to, "Book Title" 31, "Book Number" 32, "Page" 34, and "Comment" 35. In an example, the navigation publication DB 22 includes an image of a page of a book referenced during a past route planning.

Figure 4:
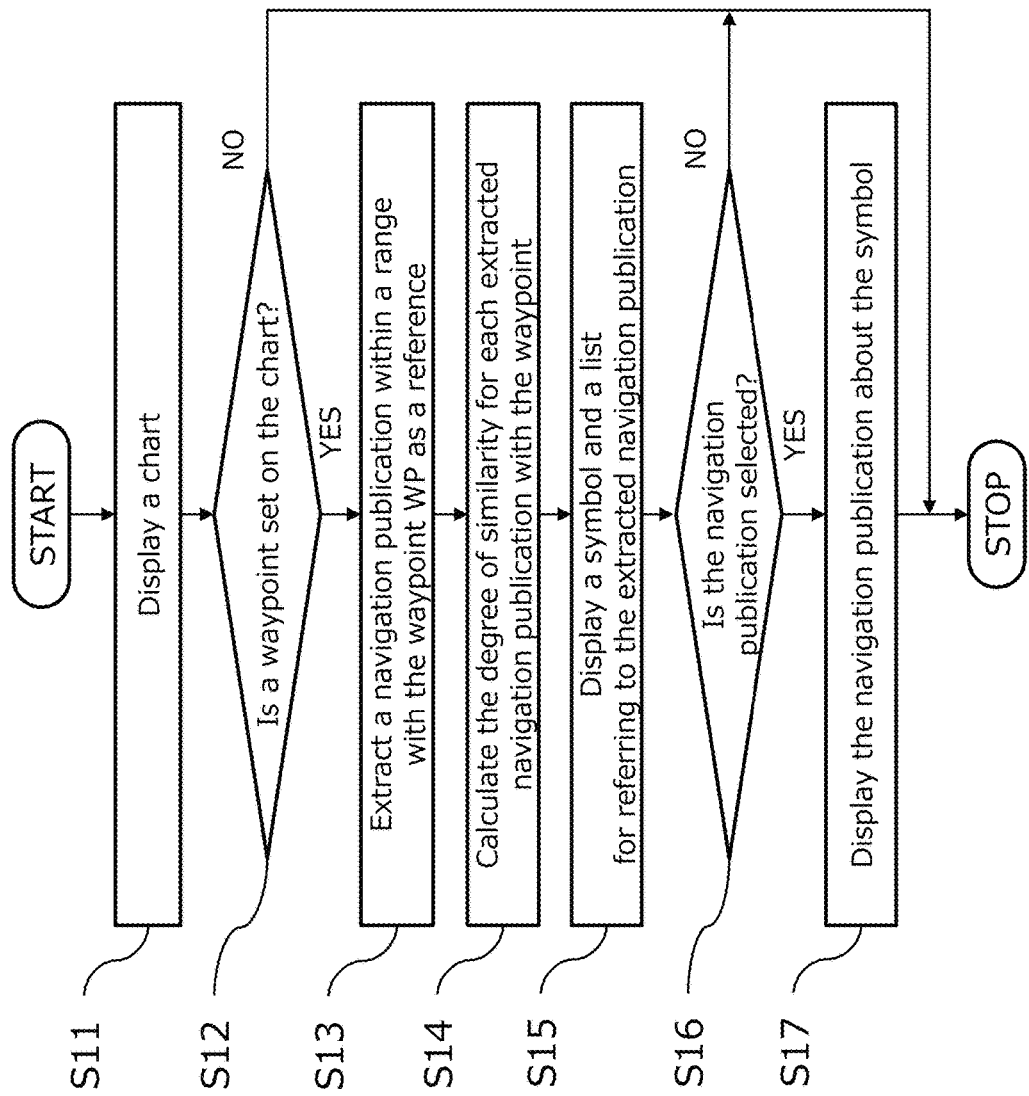
FIG. 4 is a diagram showing an example of the procedure of the route planning method, in accordance with an embodiment of the present invention.
Figure 5:
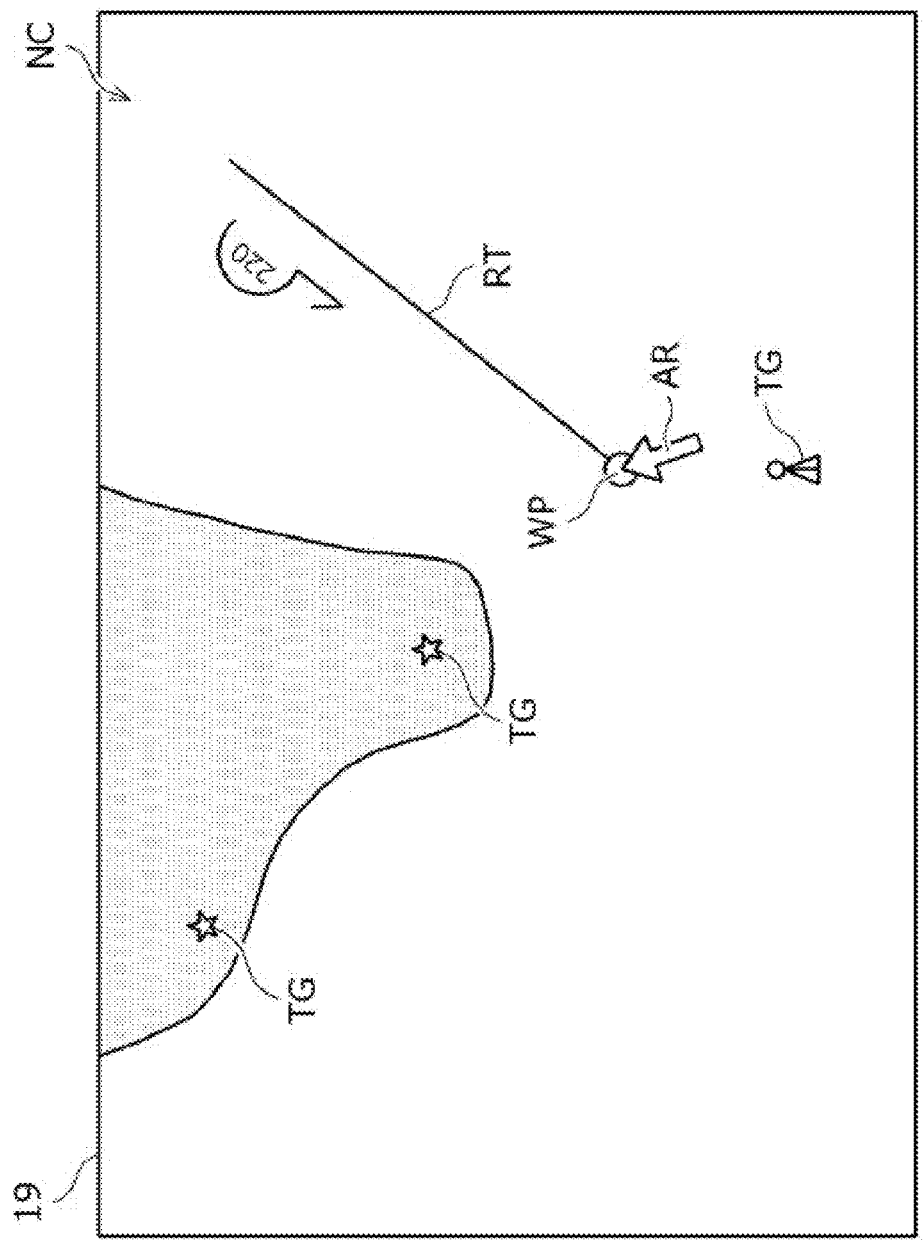
FIG. 5 shows an example of a screen display, in accordance with an embodiment of the present invention.
Figure 6:
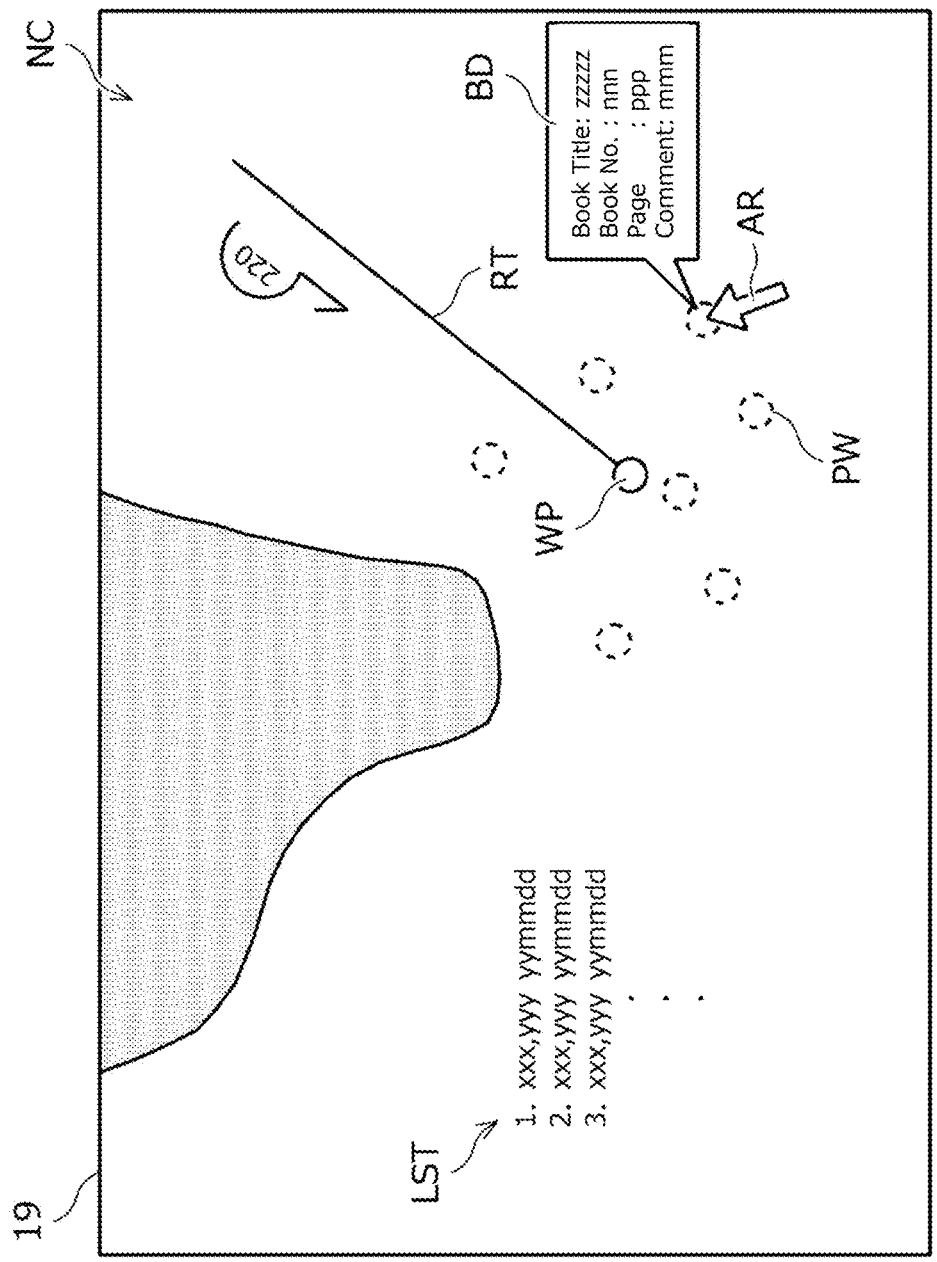
FIG. 6 shows another example of a screen display, in accordance with an embodiment of the present invention.

FIG. 4 is a flow chart showing an example of the procedure of the route planning method, according to the embodiment implemented in the route planning device 1. The processing circuitry 10 of the route planning device 1 executes the information processing shown in the FIG. 4 according to the program. FIGS. 5 and 6 are views showing an example of a screen display.

Referring back to FIG. 4, at step S11, the processing circuitry 10 is configured to display the chart NC on the screen of the display 19 with facilitation of the display control module 11 based on the chart data 21 stored in the storage 17 (S11: processed by the display control module 11). The display control module 11 is configured to display a list of the navigation publication arranged according to a predetermined degree of similarity on a screen of the display 19. This will be further explained later.

Next, at step S12, the processing circuitry 10 is configured to set the waypoint WP on the chart NC according to the user's operation received by the operation interface 18 (S12: processed by the waypoint setting module 12).

As shown in FIG. 5, a pointer AR maneuvered by the operation interface 18 is displayed on the screen of the display 19, and the waypoint WP is set at a specified position on the chart NC. A route RT connecting to the waypoint WP is also displayed on the screen of the display 19.

Returning to step S12, when a waypoint WP is set on the chart NC (S12: YES), the method proceeds to step S13. At step S13, the processing circuitry 10 is configured to extract a navigation publication within a range with the waypoint WP as a reference. The navigation publication is extracted from the navigation publication DB 22 (S13: processed by the navigation publication acquisition module 13). In addition, if at step S12, the waypoint WP is not set, then the method stops.

Specifically, the processing circuitry 10 is configured to refer to the position of each navigation publication stored in the navigation publication DB 22 to determine whether each navigation publication is included within the range based on the waypoint WP and extracts the navigation publication determined to be included within the range.

For example, a navigation publication included in a circular range of a predetermined radius centered on the waypoint WP is extracted. In that sense, the range corresponds to the circular range of the predetermined radius in this example.

Next, at step S14, the processing circuitry 10 is configured to calculate the predetermined degree of similarity for each extracted navigation publication with the waypoint WP. The predetermined degree of similarity is based on at least one of the distance from the waypoint WP, "Registration Date and Time" 37 of the navigation publication DB 22, and "vessel information" 38 (a classification, a draught, etc.).

For example, the predetermined degree of similarity is expressed by a following function f which may be a summation of the square of a Euclidean distance, by using a position $x_p$, the set date and time $t_p$, a vessel information $a_p$, and the like selected by the user's operation related to the waypoint WP, and also by using the position x, the set date and time t, and vessel information a, all of which are related to the book or the navigation publication stored in the navigation publication DB 22. In general, Euclidean distance refers to a distance between two points in Euclidean space. Euclidean distance essentially represents the shortest distance between two points. Further, position x corresponds to "position" 36, set date and time t corresponds to registration date and time 37, and vessel information a corresponds to vessel information 38 shown in the navigation publication DB 22. of the navigation publication. The function f is defined thus, as: $f(x, t, a, \ldots) = (x-x_p)^2 + (t-t_p)^2 + (a-a_p)^2 + \ldots$.

The smaller the value of the function f is, the higher is the degree of similarity.

Next, at step S15, the processing circuitry 10 is configured to display a symbol and the list for referring to the extracted navigation publication on the screen of the display 19 (S15: processed by a display control module 12). This is shown in FIG. 6.

As shown in FIG. 6, a past waypoint symbol PW indicating the presence of the navigation publication is displayed on the screen of the display 19. The past waypoint symbol PW is arranged at a position on the chart NC associated with the navigation publication.

A list LST of navigation publication is also displayed on the screen of the display 19. In the list LST, the items of the navigation publication are arranged in the descending order of the above-described predetermined degree of similarity. The item of the navigation publication included in the list LST is also a symbol for referring to the navigation publication.

Referring back to FIG. 4, next, at step S16, the processing circuitry 10 is configured to check if the navigation publication is selected or not. If the navigation publication is not selected (S16: NO), the method stops. However, if the navigation publication is selected (S16: YES), the method proceeds to step S17. At step S17, the processing circuitry 10 is configured to display the navigation publication about the symbol selected by the user operation received by the operation interface 18, out of symbols for referring to the navigation publications displayed on the screen of the display 19 (S16 and S17: processed by the display control module 12).

As shown in FIG. 6, when the pointer AR is placed on the past waypoint symbol PW, an information bubble BD that describes navigation publication such as Book Title 31, Book Number 32, Page 33, and Comment 34 is displayed. The information bubble BD may be displayed when the pointer AR is placed on an item of navigation publication included in the list LST.

According to the embodiment described above, when the waypoint is set, the navigation publication referred to in the past in the vicinity thereof is presented to the user, so that confirmation of the navigation publication referred to in the past becomes easy. Further, the navigation publication is arranged according to the predetermined degree of similarity in the list, and the user can efficiently confirm the navigation publication having a higher predetermined degree of similarity.

Note that the processing circuitry 10 may newly store the navigation publication which is newly referred to when the waypoint is set in the navigation publication DB 22 (processed by the storage processing module 14).

For example, the processing circuitry 10 prompts the user to input the navigation publication by displaying an input field of the navigation publication on the screen of the display 19 when the waypoint is set and registers the navigation publication entered in the input field in the navigation publication DB 22 in association with the position of the waypoint. In addition, the processing circuitry 10 may acquire an image of a book cover, page, or the like being photographed by the user, and extract the book title, page, or the like from the acquired image.

The navigation publication DB 22 may be an integrated database created by each of a plurality of ships. According to this, the navigation publication is centrally managed, and it becomes easy to confirm the navigation publication referred to in various ships.

The present invention is not limited to the embodiments described above, and it is of course possible for those skilled in the art to make various modifications.

DESCRIPTION OF CODES (1) Route Planning Device,
(2) Radar,
(3) GNSS Receiver,
(4) Gyrocompass,
(5) AIS,
(10) Processing Circuitry,
(11) Display Control Module,
(12) Waypoint Setting Module,
(13) Navigation Publication Acquisition Module,
(14) Storage Processing Module,
(17) Storage,
(18) Operation interface,
(19) Display,
(21) Chart Data
(22) Navigation publication DB and
(100) Ship ICT System Terminology It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A route planning device comprising:
   a display configured to display a chart on a screen;
   an operation interface configured to specify a position on the screen;
   a storage configured to store at least one navigation publication, which is related to a book referred to during a route planning performed in the past, in association with the position of a corresponding at least one existing waypoint; and
   processing circuitry configured:
      to set a new waypoint on the chart in response to an operation by a user received by the operation interface;
      to acquire, under a condition where the new waypoint has been set, from the storage, each of the at least one navigation publications that has associated therewith the corresponding at least one existing waypoint having its position within a range of the set new waypoint as a reference; and
      to display each of the acquired at least one navigation publications on the screen of the display relative to the set new waypoint.

2. The route planning device according to claim 1, wherein
   the processing circuitry is further configured to display the navigation publication at an associated position on the chart.

3. The route planning device according to claim 2, wherein
   the processing circuitry is further configured:
      to display a symbol for referring to the navigation publication; and
      to display the navigation publication associated with the symbol based on the symbol selected by the operation by the user.

4. The route planning device according to claim 2, wherein
   the processing circuitry is further configured to display a list associated with the navigation publication, the list being arranged according to an associated predetermined degree of similarity on a screen of the display.

5. The route planning device according to claim 4, wherein
   the predetermined degree of similarity is based on at least one of a distance from the waypoint, registration date and time of the navigation publication, and vessel information associated with a ship navigating the route.

6. The route planning device according to claim 2, further comprising:
   the processing circuitry is further configured to store a navigation publication database DB in the storage in association with the position, wherein
   the navigation publication DB stores the navigation publication related to the book referred to during the route planning in the past in association with the position.

7. The route planning device according to claim 6, wherein
   the navigation publication DB comprises one or more fields, wherein the one or more fields comprise at least one of a book title, a book number, a page, a comment, a positioning, registration date and time, and vessel information.

8. The route planning device according to claim 1, wherein
   the processing circuitry is further configured:
      to display a symbol for referring to the navigation publication; and
      to display the navigation publication associated with the symbol based on the symbol selected by the operation by the user.

9. The route planning device according to claim 8, wherein
   the processing circuitry is further configured to display a list associated with the navigation publication, the list being arranged according to an associated predetermined degree of similarity on a screen of the display.

10. The route planning device according to claim 9, wherein
the predetermined degree of similarity is based on at least one of a distance from the waypoint, registration date and time of the navigation publication, and vessel information associated with a ship navigating the route.

11. The route planning device according to claim 8, further comprising:
the processing circuitry is further configured to store a navigation publication database DB in the storage in association with the position, wherein
the navigation publication DB stores the navigation publication related to the book referred to during the route planning in the past in association with positioning.

12. The route planning device according to claim 11, wherein
the navigation publication DB comprises one or more fields, wherein the one or more fields comprise at least one of a book title, a book number, a page, a comment, a positioning, registration date and time, and vessel information.

13. The route planning device according to claim 1, wherein
the processing circuitry is further configured to display a list associated with the navigation publication, the list being arranged according to an associated predetermined degree of similarity on a screen of the display.

14. The route planning device according to claim 13, wherein
the predetermined degree of similarity is based on at least one of a distance from the waypoint, registration date and time of the navigation publication, and vessel information associated with a ship navigating the route.

15. The route planning device according to claim 14, further comprising:
the processing circuitry is further configured to store a navigation publication database DB in the storage in association with the position, wherein
the navigation publication DB stores the navigation publication related to the book referred to during the route planning in the past in association with positioning.

16. The route planning device according to claim 13, further comprising:
the processing circuitry is further configured to store a navigation publication database DB in the storage in association with the position, wherein
the navigation publication DB stores the navigation publication related to the book referred to during the route planning in the past in association with positioning.

17. The route planning device according to claim 1, further comprising:
the processing circuitry is further configured to store a navigation publication database DB in the storage in association with the position, wherein
the navigation publication DB stores the navigation publication related to the book referred to during the route planning in the past in association with positioning.

18. The route planning device according to claim 17, wherein
the navigation publication DB comprises one or more fields, wherein the one or more fields comprise at least one of: a book title, a book number, a page, a comment, positioning, registration date and time, and vessel information.

19. A route planning method comprising:
setting, using a processor, a new waypoint on a chart according to an operation by a user received by an operation interface;
responsive to said setting, acquiring, from a storage that stores one or more navigation publications, using the processor, each of the one or more navigation publications having associated therewith a corresponding existing waypoint with its position within a range of the set new waypoint as a reference, each of the navigation publications being related to a book referred to during past route planning in association with a position of the corresponding existing waypoint; and
displaying each of the acquired one or more navigation publications relative to the set new waypoint.

20. A non-transitory computer-readable storage medium storing processor-executable instructions that when executed, cause one or more processors to:
set a new waypoint on a chart according to an operation received at an operation interface;
responsive to the setting of the new waypoint, acquire, from a storage that stores one or more navigation publications, each of the one or more navigation publications having associated therewith a corresponding existing waypoint with its position within a range of the set new waypoint as a reference, each of the navigation publications being related to a book referred to during past route planning in association with a position of the corresponding existing waypoint; and
display each of the acquired one or more navigation publications relative to the set new waypoint.

* * * * *